(12) United States Patent
Borchers et al.

(10) Patent No.: US 11,416,227 B2
(45) Date of Patent: Aug. 16, 2022

(54) METHOD FOR EXECUTING PROGRAM COMPONENTS ON A CONTROL UNIT, A COMPUTER-READABLE STORAGE MEDIUM, A CONTROL UNIT AND A SYSTEM

(71) Applicant: Bayerische Motoren Werke Aktiengesellschaft, Munich (DE)

(72) Inventors: Christoph Borchers, Munich (DE); Jakob Reuter, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/299,150

(22) PCT Filed: Jan. 31, 2019

(86) PCT No.: PCT/EP2019/052315
§ 371 (c)(1),
(2) Date: Jun. 2, 2021

(87) PCT Pub. No.: WO2020/156668
PCT Pub. Date: Aug. 6, 2020

(65) Prior Publication Data
US 2022/0050668 A1 Feb. 17, 2022

(51) Int. Cl.
*G06F 8/41* (2018.01)
*G06F 8/30* (2018.01)
(Continued)

(52) U.S. Cl.
CPC .............. *G06F 8/44* (2013.01); *G06F 8/31* (2013.01); *G06F 8/54* (2013.01); *G06F 9/48* (2013.01); *G06F 9/5027* (2013.01)

(58) Field of Classification Search
None
See application file for complete search history.

(56) References Cited

U.S. PATENT DOCUMENTS

| 7,433,813 B1* | 10/2008 | Ballagh | G06F 30/33 326/39 |
| 2016/0085567 A1* | 3/2016 | Holler | G05B 17/02 718/1 |

(Continued)

OTHER PUBLICATIONS

International Search Report (PCT/ISA/210) issued in PCT Application No. PCT/EP2019/052315 dated Oct. 23, 2019 with English translation (three (3) pages).

(Continued)

*Primary Examiner* — Ryan D. Coyer
(74) *Attorney, Agent, or Firm* — Crowell & Moring LLP

(57) ABSTRACT

A method for executing program components on a control unit includes receiving a first program unit and a second program unit; producing a first proxy definition and a second proxy definition, wherein a proxy definition stipulates access to at least one function and/or a memory area of a program unit, wherein the first proxy definition is associated with the first program unit and the second proxy definition is associated with the second program unit; compiling the first program unit and the second program unit to produce a first program component, a second program component, a first proxy component and a second proxy component; and executing the first program component and the second program component on a control unit, wherein the first program component calls and/or uses at least one function of the second program component by using the first proxy component and the second proxy component.

12 Claims, 3 Drawing Sheets

(51) Int. Cl.
*G06F 8/54* (2018.01)
*G06F 9/48* (2006.01)
*G06F 9/50* (2006.01)

(56) References Cited

U.S. PATENT DOCUMENTS

| | | | | |
|---|---|---|---|---|
| 2016/0164881 A1* | 6/2016 | Bankowski | ........... | H04L 63/105 |
| | | | | 726/4 |
| 2016/0239275 A1* | 8/2016 | Singh | ....................... | H04L 67/56 |
| 2017/0257345 A1* | 9/2017 | Westra | ................. | H04L 63/029 |
| 2020/0084287 A1* | 3/2020 | Wilczynski | ............. | G06F 9/547 |

OTHER PUBLICATIONS

German-language Written Opinion (PCT/ISA/237) issued in PCT Application No. PCT/EP2019/052315 dated Oct. 23, 2019 (six (6) pages).
Geissmann et al., Separate Compilation in Modula-2 and the Structure of the Modula-2 Compiler on the Personal Computer Lilith, Jan. 1, 1983, pp. 1-126, retrieved from the internet: https://cfbsoftware.com/modula2/ETH7286.pdf, XP055629430 (64 pages).

\* cited by examiner

METHOD FOR EXECUTING PROGRAM COMPONENTS ON A CONTROL UNIT, A COMPUTER-READABLE STORAGE MEDIUM, A CONTROL UNIT AND A SYSTEM

BACKGROUND AND SUMMARY OF THE INVENTION

The invention relates to a method for executing program components on a control unit, to a computer-readable storage medium, to a control unit and to a system.

Vehicles, such as automobiles, comprise control units for controlling the vehicle functions. In this case, a separate control unit is traditionally used for each control entity. A separate control unit is therefore respectively used for the lateral dynamics of the vehicle or for individual driver assistance systems.

A disadvantage of this is that a plurality of control units must be accommodated in the limited installation space of the vehicle. This is disadvantageous since there is therefore less flexibility when designing the vehicles. An important disadvantage is also the fact that a control unit is respectively designed precisely for the functions to be performed, that is to say in terms of the memory provided and the computing capacity. This is disadvantageous since functions can therefore be retrofitted only within the scope of the existing hardware limits by performing a software update.

Universal control units which control a plurality of functions of the vehicle are therefore being increasingly used in modern vehicles. For this purpose, the universal control units have a plurality of computing cores, wherein one or more of the computing cores can be respectively assigned to different functions. Memory areas can also be assigned to different functional units.

As a result of the fact that a plurality of functions are combined on one universal control unit, it is more frequently necessary to update the control unit, that is to say to update the software. The universal control units have different partitions, wherein an operating system, for example an Autosar OS-based system, is stored in one of the partitions and controls the execution of the further applications. The respective application for a control function of the control unit is then stored in individual other partitions. For example, an Autosar OS operating system can be stored in a first partition. The software for controlling the lateral dynamics can be stored in a second partition and the software for controlling a driver assistance function can be stored in a third partition.

Before a function is updated, it is necessary to check whether the function to be updated is critical to safety. If this is the case, a test drive must be carried out with a test vehicle after the updating. This takes a lot of time and is expensive.

This disadvantage is intensified by virtue of the fact that the programming languages used in universal control units usually require all components to be recompiled if only one component changes. This means that program sections which have not changed are often recompiled. This results in a number of test drives and waiting times which would not necessarily be required.

Proceeding from this prior art, the object of the invention is therefore to reduce the number of necessary test drives after updating a control unit. The object of the invention is also, in particular, to accelerate the updating of control units. The object of the invention is also, in particular, to reduce the computing capacity required during compiling.

This object is achieved by the claimed invention.

In particular, the object is achieved by a method for executing program components on a control unit, in particular on a control unit of a vehicle, preferably an automobile, comprising the following steps of:

receiving at least one first program unit and at least one second program unit;

generating a first proxy definition and a second proxy definition, wherein a proxy definition stipulates access to at least one function and/or a memory area of a program unit, wherein the first proxy definition is assigned to the first program unit and the second proxy definition is assigned to the second program unit;

compiling the first program unit and the second program unit in order to generate a first program component and a second program component and compiling the first and second proxy definitions in order to generate a first and a second proxy component;

executing the first program component and the second program component on a control unit, wherein the first program component calls and/or uses at least one function of the second program component using the first and second proxy components.

An essence of embodiments of the invention is that proxy definitions which are in turn compiled to form proxy components are generated for the program units. The first and second program components can each call functions of the other program component using these proxy components. The interface between the first and second program components is therefore formed by the first and second proxy components. In the event of a change in only one program component, in which the interface does not change, it is therefore possible to dispense with compiling the component which has not changed.

In one embodiment, the first and second program components may be in the form of binary files which can each be executed by a computing core of a control unit.

The first and second program components may therefore constitute individual binary files which can be stored, for example as images, in partitions of the control unit and can therefore be executed by a computing core of the one control unit. Within the scope of this application, a computing core of a control unit may also comprise a processor core of a processor of a control unit.

In one embodiment, execution may comprise executing the first program component and/or the first proxy component on a first computing core of the control unit and executing the second program component and/or the second proxy component on a second computing core of the control unit.

It is therefore possible for different computing cores to execute different program components. In this case, an assignment of a program component to a computing core may be dynamically or statically stipulated.

In one embodiment, the first program unit and/or the second program unit may comprise source code of a programming language, in particular embedded C.

Embedded C has proved itself in the embedded programming of control units. An implementation which is easy to implement is therefore stated.

In one embodiment, the first proxy definition and/or the second proxy definition may indicate addresses of functions of the first program component and/or second program component.

It is particularly advantageous for the implementation of the invention if the proxy definitions contain details of which memory addresses can be used to call functions of program components. It is likewise advantageous if the proxy definitions contain details of shared memory areas. The described embodiment is used to indicate a simple way of stipulating the interface between the first and second program components.

In one embodiment, the method may comprise the following steps:

receiving a third program unit which corresponds, in terms of its interfaces, to the second program unit;

compiling only the third program unit in order to generate a third program component;

executing the first program component and the third program component on a control unit, wherein the third program component calls and/or uses at least one function of the first program component using the first and second proxy components.

The third program unit may be, for example, an updated version of the second program unit in which the interfaces have not changed. It is now not necessary to recompile the first program unit. The third program component can access the functions and memory areas of the first program component using the first and second proxy components, with the result that they also do not have to be generated again.

In one embodiment, the third program unit can be compiled using a set of rules, wherein the set of rules can comprise at least one rule which can state whether it is necessary to compile the first program unit in order to compile the third program unit.

A rule may state conditions of when individual program components are recompiled in the event of changes. In one embodiment, a rule may therefore state that a program component must be recompiled when it has changed a functional definition of a function of the program component. In one embodiment, a further possible rule may state that a program component must be recompiled if the size of a shared memory area has changed.

In one embodiment, the first program component may comprise an operating system for the control unit and/or the first component may be designed to control the lateral dynamics of a vehicle, and/or the third program component may be designed to control at least one driver assistance system of a vehicle.

In one advantageous embodiment, the communication between the control of the lateral dynamics and the control of at least one driver assistance system can be carried out by the proxy components.

The advantages described above take effect, in particular, in these frequently updated components since frequent updating would otherwise result in compiling of all components, which takes a lot of time and would necessitate further test drives in the vehicle.

The object is also achieved, in particular, by a computer-readable storage medium which contains instructions which cause at least one processor to implement a method as described above when the instructions are executed by the at least one processor.

Similar or identical advantages to those already described in connection with the method emerge.

The object is also achieved, in particular, by a control unit which is designed to control functions of a connected vehicle using a first program component generated according to the method described above, a second program component and a proxy component.

Similar or identical advantages to those already described in connection with the method emerge.

The object is also achieved, in particular, by a system comprising:

a vehicle having a control unit;

a computer unit which is designed:
- to receive at least one first program unit and at least one second program unit;
- to generate a first proxy definition and a second proxy definition, wherein a proxy definition stipulates access to at least one function and/or a memory area of a program unit, wherein the first proxy definition is assigned to the first program unit and the second proxy definition is assigned to the second program unit;
- to compile the first program unit and the second program unit in order to generate a first program component, a second program component and a first and a second proxy component;

wherein the control unit is designed to execute the first program component and the second program component, wherein the first program component calls and/or uses at least one function of the second program component using the first and second proxy components.

The system may comprise the memory unit described above.

Similar or identical advantages to those already described in connection with the method emerge.

The system may implement some or all of the method steps described above.

The invention is explained in more detail below on the basis of exemplary embodiments.

DETAILED DESCRIPTION OF THE DRAWINGS

The same reference signs are used below for identical or identically acting parts.

Figure 1:
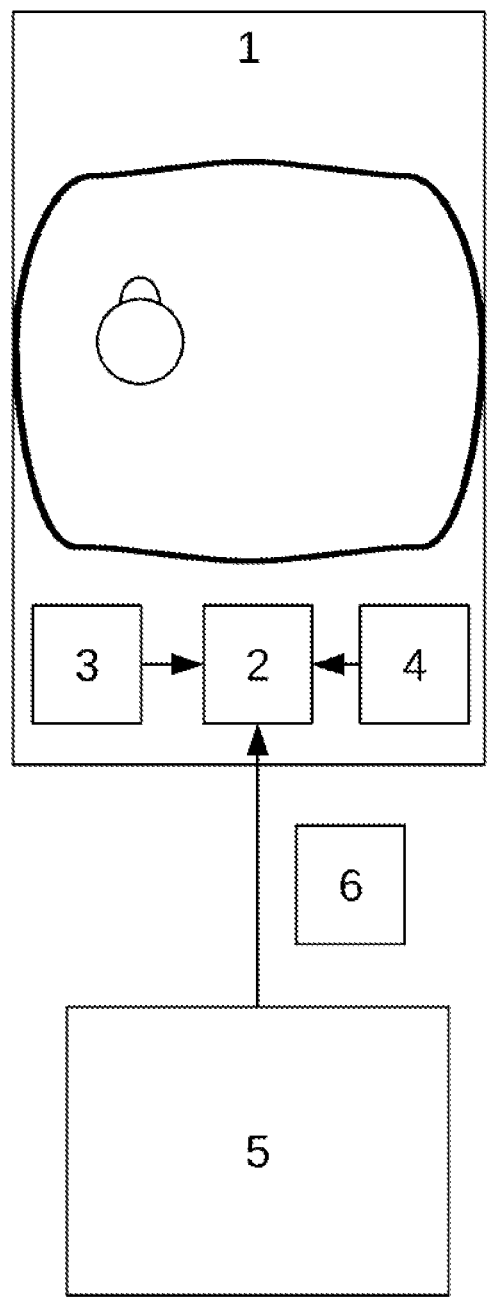
FIG. 1 shows a schematic illustration of a vehicle.

FIG. 1 shows a vehicle 1 having a control unit 2, a driver assistance system 3, and a lateral dynamics system 4. In the present exemplary embodiment, the driver assistance system 3 is an automatic braking system which brings the vehicle 1 to a standstill when a vehicle traveling in front brakes abruptly. The driver assistance system 3 is therefore a safety-critical system.

The lateral dynamics system 4 controls functions which relate substantially to the lateral forces of the vehicle 1, for example the steering system.

The driver assistance system 3 and the lateral dynamics system 4 are communicatively connected to a control unit 2. For example, the control unit 2, the driver assistance system 3 and the lateral dynamics system 4 may be connected to one another via a vehicle bus, for example a CAN bus.

In the exemplary embodiment shown, the control unit 2 is a universal control unit 2 having a multiplicity of processors and a memory device. Three partitions are provided in the memory device, wherein an operating system partition stores an Autosar OS-based operating system. A driver assistance partition stores program components for implementing the desired driver assistance function, that is to say the automatic braking system in this exemplary embodiment. A lateral dynamics partition stores program components for implementing the lateral dynamics.

If a new version of the program components executed on the control unit 2 is intended to be installed, the control unit is connected to a development computer 5 in a wired or wireless manner. The development computer 5 may also be a so-called tester or another device which can be used to install program components on the control unit 2. In one exemplary embodiment, the development computer 5 is in the form of a mobile terminal which is wirelessly connected to the control unit 2.

It is also possible for the control unit to have a mobile radio or WLAN module which can be communicatively connected to the development computer 5.

Figure 2:
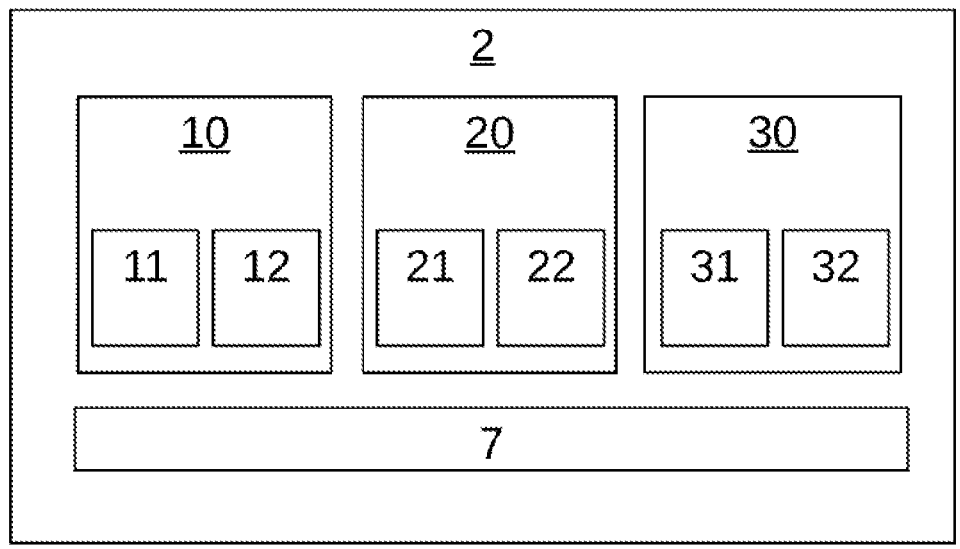
FIG. 2 shows a schematic illustration of three computing cores of a control unit.

FIG. 2 shows the logical structure of the control unit 2 in detail. The control unit 2 comprises three virtual execution environments 10, 20, 30 for executing program components. Computing cores of a processor of the control unit 2 are respectively assigned to each of the virtual execution environments 10, 20, 30. A first virtual execution environment 10 therefore has a first computing core 11 and a second computing core 12. A second virtual execution environment 20 has a third computing core 21 and a fourth computing core 22. A third virtual execution environment 30 has a fifth computing core 31 and a sixth computing core 32.

The program components executed by the corresponding computing cores 11, 12, 21, 22, 31, 32 can communicate with one another via a hardware level 7. This means that the hardware level 7 provides devices which allow a program component, which is executed by the first computing core 11, to call a function of a program component which is executed by the third computing core 21.

Figure 3:
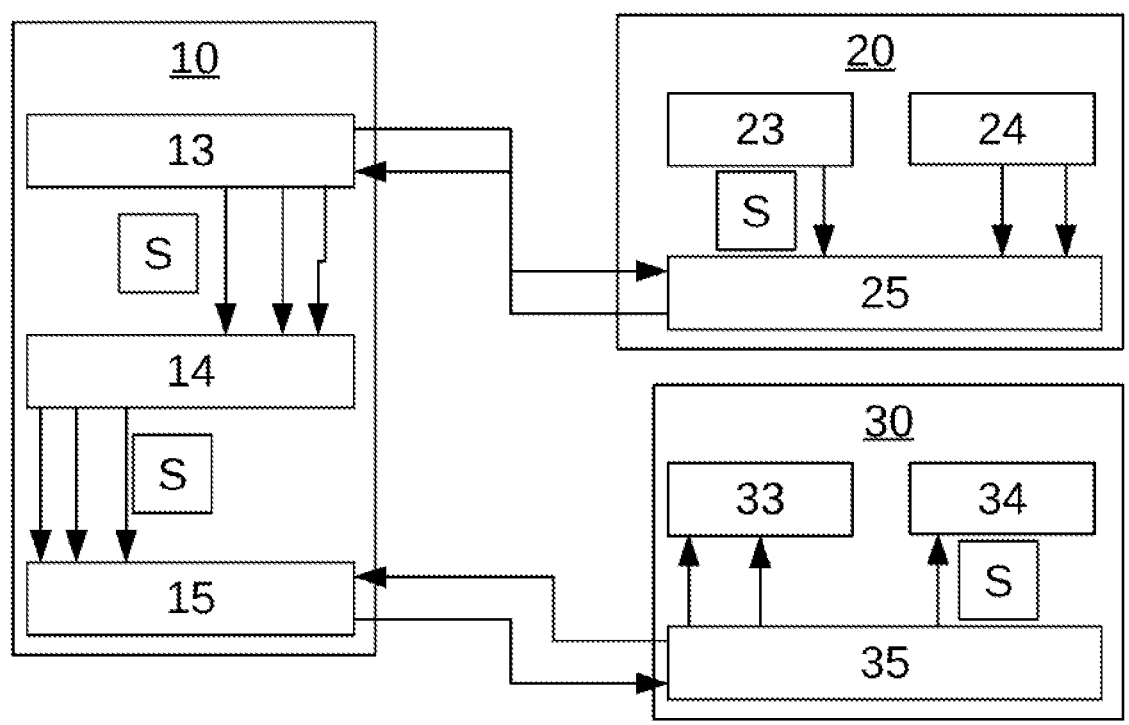
FIG. 3 shows a schematic illustration of three program components and the communication between them.

FIG. 3 illustrates the communication between the program components which are executed by different computing cores. In this respect, FIG. 3 shows the first, the second and the third virtual execution environments 10, 20, 30. In the exemplary embodiment in FIG. 3, the operating system of the control unit 2 can be executed in the first virtual execution environment 10. In the exemplary embodiment, the second virtual execution environment 20 can execute a driver assistance system by using program components 23, 24. In the exemplary embodiment, the third virtual execution environment 30 can control the lateral dynamics of the vehicle 1 by using the program components 33, 34.

As stated, the driver assistance system may be, for example, an automatic braking system. During braking by the automatic braking system, it may be necessary for the lateral dynamics to also be controlled by the automatic braking system. This means that the automatic braking system must access functions of the lateral dynamics. For example, the automatic braking system may call a function which is provided by the program component 34.

For such a function call, the computing component 23 transmits a signal S to the first virtual execution environment 10, which signal S is forwarded, via a proxy interface 25 to a further proxy interface 13 of the first virtual execution environment 10, to an internal communication unit 14. The signal S is passed from the internal communication unit 14 to a proxy interface 15 which is in turn communicatively connected to a proxy interface 35 of third virtual execution environment 30. The proxy interface 35 and initiates the function call using the signal S in the program component 34.

Figure 4:
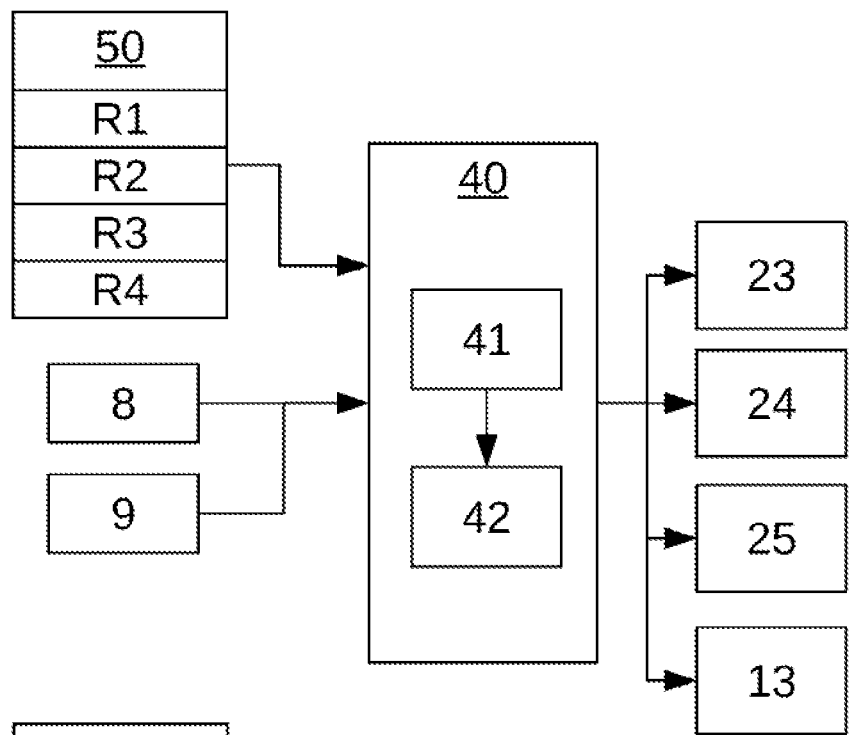
FIG. 4 shows a schematic illustration of the generation of three program components using a set of rules.
Figure 5:
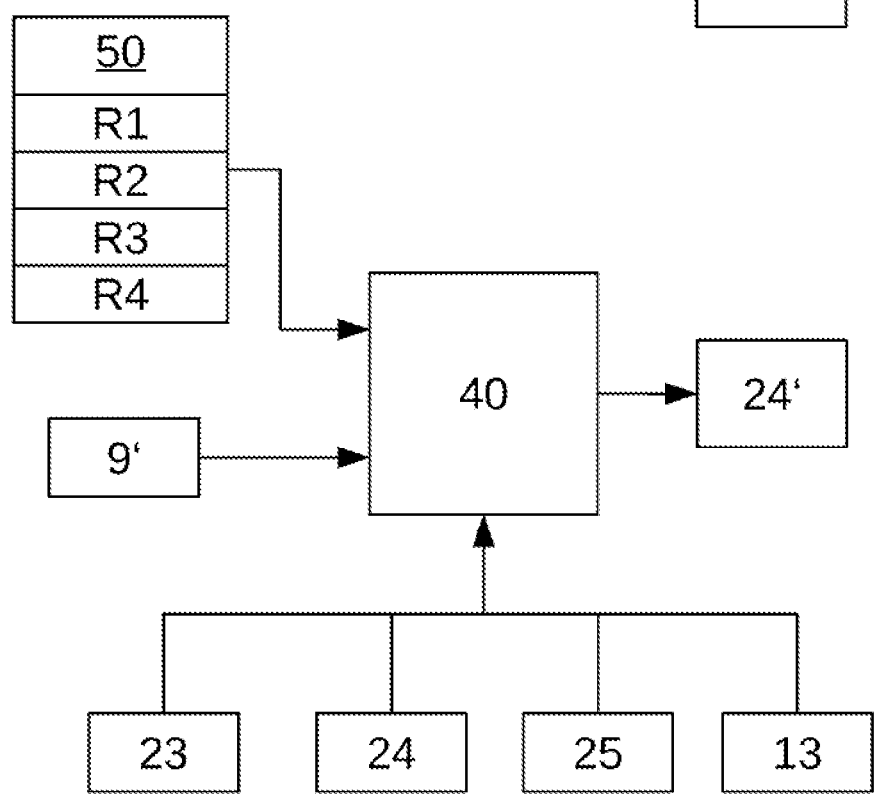
FIG. 5 shows a schematic illustration of the updating of a program component.

FIGS. 4 and 5 illustrate the first compiling of the components just described and the updating of an individual program component.

FIG. 4 shows two program units 8, 9 which represent embedded C source code files in the exemplary embodiment shown. In order to create executable program components, it is necessary to compile the source code and to link different program components. A linker/compiler unit 40 is used for this purpose. The linker/compiler unit 40 comprises a proxy generation unit 41 and a linker 42. The proxy generation unit 41 is designed to identify function calls and access operations between the program units 8, 9. The proxy generation unit 41 generates proxy components 13, 25 from this information. In addition, the program components 23, 24 which can be executed by a control unit 2 are generated.

FIG. 5 shows a situation in which the program unit 9 is updated. For this purpose, the linker/compiler unit 40 receives an updated program unit 9' in which the implementation of individual functions was optimized. The interfaces and the operations of accessing other functions have remained the same. The linker/compiler unit 40, in particular the linker 42 there, analyzes the program unit 9' and compares it with the existing program unit 9.

A rule memory unit 50 stores rules R1-R4 which state the prerequisites under which it suffices to compile only the program unit 9' or state whether all program units 8, 9' must be recompiled.

For example, the rule R1 states that all program units 8, 9' must be compiled if the program unit 9' changes the size of shared memory areas.

The linker/compiler unit 40 uses the rules R1-R4 and/or the already existing program components 23, 24 and/or the existing proxy components 25, 13 to analyze whether only the program unit 9' must be compiled. In the exemplary embodiment shown, the linker/compiler unit 40 determines that only the program unit 9' must be compiled, with the result that a new program component 24' which replaces the previous program component 24 is generated. In this case, the program component 24' is designed to use the proxy component 25 to access functions and memory areas of the program component 23.

Overall, only a single program unit must be recompiled. This reduces the computing power to be applied, with the result that the program can be updated more quickly. In addition, it is not necessary to carry out a new test drive with a test vehicle provided that the recompiled component is not a safety-critical component. This makes it possible to save considerable costs.

LIST OF REFERENCE SIGNS

1 Vehicle
2 Control unit
3 Driver assistance system
4 Lateral dynamics system
5 Development computer
6 Compiled program/binary files
7 Hardware level
8, 9, 9' Program unit
10 First virtual execution environment
11 First computing core
12 Second computing core
13, 15, 25, 35 Proxy interface
14 Internal communication unit
20 Second virtual execution environment
21 Third computing core
22 Fourth computing core
23, 24, 24', 33, 34 Program component
30 Third virtual execution environment
31 Fifth computing core 32 Sixth computing core
40 Linker/compiler unit
41 Proxy generation unit
42 Linker
50 Rule memory unit
R1-R4 Rule
S Signal

What is claimed is:

1. A method for executing program components on a control unit of a vehicle, the method comprising:
 receiving a first program unit and a second program unit;
 generating a first proxy definition and a second proxy definition, wherein each proxy definition stipulates access to at least one of a function or a memory area of a respective program unit, the first proxy definition is assigned to the first program unit, and the second proxy definition is assigned to the second program unit;
 compiling the first program unit and the second program unit in order to generate a first program component and a second program component, and compiling the first proxy definition and the second proxy definition in order to generate a first proxy component and a second proxy component; and
 executing the first program component and the second program component on a control unit, wherein the first program component at least one of calls or uses at least one function of the second program component using the first and second proxy components.

2. The method according to claim 1, wherein
 the first and second program components are binary files which can be executed by a computing core of the control unit.

3. The method according to claim 1, wherein execution comprises:
 executing at least one of the first program component or the first proxy component on a first computing core of the control unit, and
 executing at least one of the second program component or the second proxy component on a second computing core of the control unit.

4. The method according to claim 1, wherein at least one of the first program unit or the second program unit comprises source code of a programming language.

5. The method according to claim 4, wherein the programming language is embedded C.

6. The method according to claim 1, wherein at least one of the first proxy definition or the second proxy definition indicates addresses of functions of at least one of the first program component or the second program component.

7. The method according to claim 1, wherein at least one of the first proxy definition or the second proxy definition indicates shared memory areas of at least one of the first program component or the second program component.

8. The method according to claim 1, further comprising:
 receiving a third program unit which corresponds, in terms of its interfaces, to the second program unit;
 compiling only the third program unit in order to generate a third program component; and
 executing the first program component and the third program component on the control unit, wherein the third program component at least one of calls or uses at least one function of the first program component using the first proxy component and the second proxy component.

9. The method according to claim 8, wherein the third program unit is compiled using a set of rules comprising at least one rule which states whether it is necessary to compile the first program unit in order to compile the third program unit.

10. The method according to claim 1, wherein at least one of:
 the first program component comprises an operating system for the control unit,
 the first component is configured to control lateral dynamics of a vehicle, or at least one of the second program component or the third program component is configured to control at least one driver assistance system of the vehicle.

11. A computer product comprising a non-transitory computer-readable medium having stored thereon program code which, when executed on a processor, a microcontroller, or a programmable hardware component, carries out the acts of:
 receiving a first program unit and a second program unit;
 generating a first proxy definition and a second proxy definition, wherein each proxy definition stipulates access to at least one of a function or a memory area of a respective program unit, the first proxy definition is assigned to the first program unit, and the second proxy definition is assigned to the second program unit;
 compiling the first program unit and the second program unit in order to generate a first program component and a second program component, and compiling the first proxy definition and the second proxy definition in order to generate a first proxy component and a second proxy component; and
 executing the first program component and the second program component on a control unit, wherein the first program component at least one of calls or uses at least one function of the second program component using the first and second proxy components.

12. A system comprising:
 a vehicle comprising a control unit; and
 a computer unit which is configured to:
  receive a first program unit and a second program unit;
  generate a first proxy definition and a second proxy definition, wherein each proxy definition stipulates access to at least one function or a memory area of a respective program unit, the first proxy definition is assigned to the first program unit, and the second proxy definition is assigned to the second program unit; and
  compile the first program unit and the second program unit in order to generate a first program component and a second program component, and compile the first proxy definition and the second proxy definition in order to generate a first proxy component and a second proxy component;
 wherein the control unit is configured to execute the first program component and the second program component, and the first program component at least one of calls or uses at least one function of the second program component using the first and second proxy components.

* * * * *